Oct. 27, 1942.    W. PRICE    2,299,847
CUTOFF VALVE
Filed July 14, 1941

Wallace Price:
INVENTOR
BY Victor J. Evans & Co.
ATTORNEYS

Patented Oct. 27, 1942

2,299,847

UNITED STATES PATENT OFFICE 2,299,847

CUTOFF VALVE

Wallace Price, Alice, Tex.

Application July 14, 1941, Serial No. 402,381

2 Claims. (Cl. 251—145)

This invention relates to a cut-off valve and has for an object to provide an automatic valve of this type adapted to stop a steam, gas or compressed air pump when the load is taken off the pump, the pressure medium being cut off, according to the present invention, by the closing of a plunger against a valve seat when the pressure is released, the valve being opened by accumulation of pressure when a resistance is offered by the fluid in the fluid side of a pump, such as a pump used in oil lines.

A further object is to provide a valve of this character adapted to be used in combination with a volume control cut-off valve in the pressure line, there being a by-pass in the automatic valve through which pressure passes from the high side of the automatic valve to the low side when the volume control valve is open, and if the pump is loaded the pressure builds up in the low side sufficiently to force the plunger of the automatic valve off its seat and allow unobstructed passage of the pressure medium to the pump.

A further object is to provide an automatic valve of this type in which the plunger is biased by an adjustable spring so that when the pump is loaded the pressure in the entire pressure medium line is high enough to maintain the spring in a compressed state and maintain the plunger valve open, but when the load on the pump drops, or the pump "goes on air" the pump speed will be accelerated with the result that the pressure medium is passed through the pump faster than the volume valve will admit it and accordingly pressure between the volume valve and the pump drops proportionately to the load and becomes less than the pressure of the spring so that the plunger valve is forced back onto its seat and cuts off the gas pressure medium to stop the pump.

A further object is to provide an automatic valve of this type in which the by-pass is controlled by a ported jet valve which may be left open to permit the pump to idle when it is not loaded, and which may be closed after the pump has been started to permit the automatic valve to stop the pump when the load drops.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
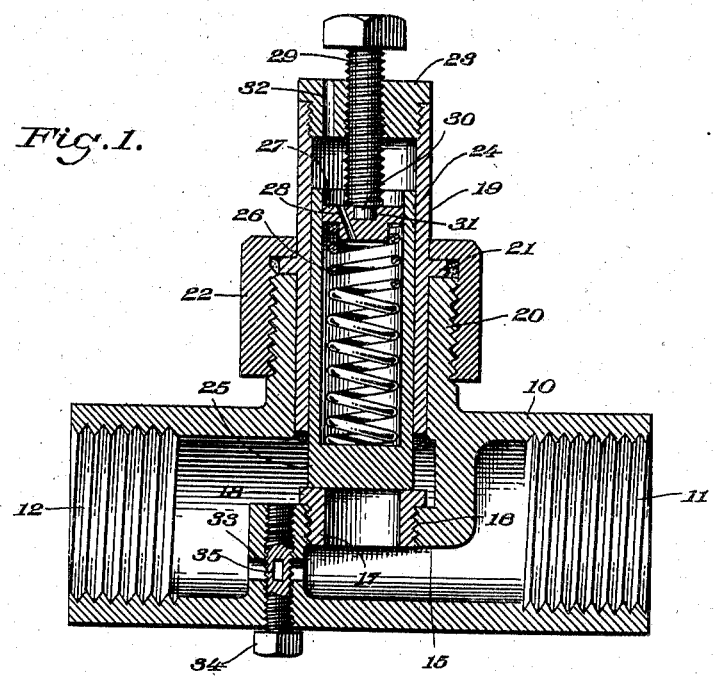
Figure 1 is a longitudinal sectional view of an automatic cut-off valve constructed in accordance with the invention.

Referring now to the drawing in which like characters of reference designate similar parts in the various views, 10 designates a valve housing having the screw threads 11 on the low pressure side, and screw threads 12 on the high pressure side to respectively attach the housing to a section 13 of a pipe line leading to a pressure operated pump, and to a section 14 of the pipe line leading to a source of pressure supply.

The housing is provided with an angular diaphragm 15 which separates the low pressure side and the high pressure side and which is provided with a threaded opening 16 to receive the threaded neck 17 of a tubular valve seat 18, through which pressure may pass from the high side to the low side of the housing.

A tubular plunger housing 19 is removably fitted in an exteriorly threaded extension 20 and is provided with a flange 21 which is clamped to the end of the extension by an interiorly threaded nut 22. The plunger housing projects through the nut and is closed at the outer end by a screw plug 23.

A hollow plunger 24 is slidably fitted in the plunger housing 19 and is closed at one end by a transverse head 25 which forms a main valve adapted to control the valve seat 18. A helical spring 26 is housed within the hollow plunger and at the outer end is engaged against a follower 27 which is provided with a vent passage 28.

An adjusting screw 29 is threadedly engaged in an axial opening in the plug 23 and is provided at the inner end with a cylindrical tip 30 which is swivelly engaged in an opening 31 formed in the outer end of the follower 27. Laterally of the adjusting screw the plug is provided with a vent 32 through which, and the vent 28 of the follower the hollow plunger is vented to the atmosphere to prevent the creation of gas pressure in the plunger housing and hollow plunger.

A by-pass 33 is formed in the diaphragm parallel with the axis of the valve housing 10 and establishes communication between the high pressure side and low pressure side of the valve housing around the main valve 25. The by-pass is controlled by a threaded jet valve 34 having a port 35 adapted to be brought into communication with the by-pass when the jet valve 34 is turned in one direction and to be turned out of registration with the by-pass when the valve is turned in the opposite direction.

Figure 2:
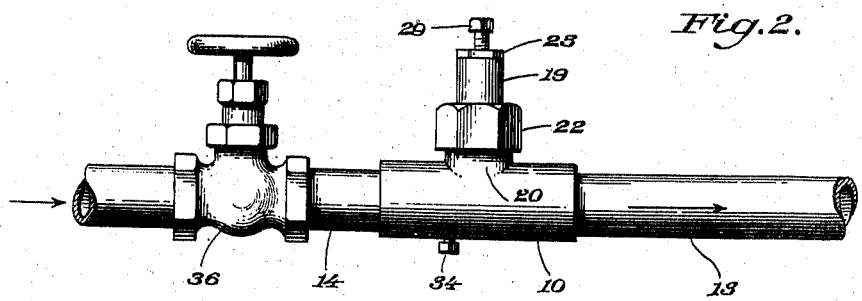
Figure 2 is a side elevation of the valve applied in a pressure line leading to a pump and preceded in the line by a volume control valve.

In operation a conventional volume control cut-off valve 36 is assembled in the high pressure section 14 of the pipe line in advance of the automatic valve above described, see Figure 2.

When the jet valve 34 is opened and the volume control valve 36 is also opened gas pressure medium passes from the high side to the low side of the valve housing through the by-pass 33. If the pump is loaded pressure builds up in the low side sufficient to force the main plunger valve 25 off the valve seat 18 to permit unobstructed gas pressure through the valve seat from the high side to the low side of the housing 10. As long as the pump is loaded pressure in the entire pressure line is high enough to maintain the helical spring 26 compressed and the plunger valve 25 open. When the load on the pump drops, or the pump "goes on air" the speed of the pump is accelerated and gas pressure is passed through the pump faster than the volume valve 36 will admit it so that pressure between the volume valve and the pump drops in proportion to the load on the pump and ultimately becomes less than the pressure of the spring 26 on the plunger valve 25, the spring thereupon forcing the plunger valve back onto its seat 18 to cut off the gas pressure supply and stop the pump. If the jet valve 34 is left open the pump will idle when it is not loaded, but if the jet valve is closed after the pump has been started, the pump will stop when the load drops, as above described.

From the above description it is thought the construction and operation of the invention will be fully understood without further explanation.

What is claimed is:

1. A pressure responsive cut-off valve comprising a casing, a diaphragm in the casing, a tubular valve seat in the diaphragm, a plunger housing extending from the valve casing, a hollow plunger in the housing, a threaded plug closing the outer end of the plunger housing and vented to the atmosphere, a sliding follower in the plunger housing having a vent port, a helical spring confined under tension between the follower and a closed end of the hollow plunger, said closed end forming a plunger valve adapted to seat on the tubular valve seat under urge of said spring, and an adjusting screw engaged through said threaded plug and swively connected to said follower.

2. A pressure responsive valve, comprising a cylindrical casing, a diaphragm dividing the casing and having a passage therethrough transverse the casing with a valve seat, a tubular lateral extension communicating with the casing opposite the valve and externally threaded, a tubular plunger cylinder fitting in said extension and provided with an annular external flange intermediate its ends and resting upon the upper end of the tubular extension, a nut threaded on the tubular extension with a laterally turned upper end engaging the annular flange, a hollow plunger in the plunger cylinder, a spring in said plunger, a sliding follower in the plunger having a vent port, a cap closing the upper end of the plunger cylinder and provided with an opening, and an adjusting screw carried by the cap and swively connected to the sliding follower.

WALLACE PRICE.